(12) United States Patent  
Tomotoshi et al.

(10) Patent No.: US 8,976,107 B2  
(45) Date of Patent: Mar. 10, 2015

(54) DISPLAY ELEMENT AND ELECTRICAL DEVICE USING THE SAME

(75) Inventors: Takuma Tomotoshi, Osaka (JP); Kohzoh Nakamura, Osaka (JP); Shun Ueki, Osaka (JP); Toshiki Matsuoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 443 days.

(21) Appl. No.: 13/515,269

(22) PCT Filed: Sep. 24, 2010

(86) PCT No.: PCT/JP2010/066538  
§ 371 (c)(1),  
(2), (4) Date: Jun. 11, 2012

(87) PCT Pub. No.: WO2011/074304  
PCT Pub. Date: Jun. 23, 2011

(65) Prior Publication Data  
US 2012/0268447 A1   Oct. 25, 2012

(30) Foreign Application Priority Data

Dec. 15, 2009  (JP) ................. 2009-284194

(51) Int. Cl.  
G09G 3/34       (2006.01)  
G02B 26/00      (2006.01)

(52) U.S. Cl.  
CPC ................... G02B 26/004 (2013.01)  
USPC ...................................................... 345/107

(58) Field of Classification Search  
None  
See application file for complete search history.

(56) References Cited

U.S. PATENT DOCUMENTS

| 5,643,471 A | 7/1997 | Onishi et al. |
| 6,563,558 B2 * | 5/2003 | Koma ........................... 349/110 |
| 7,911,681 B2 | 3/2011 | Ikegami et al. |
| 8,144,382 B2 | 3/2012 | Muneyoshi et al. |
| 2001/0017985 A1 | 8/2001 | Tsuboi et al. |
| 2007/0165178 A1 * | 7/2007 | Ohnishi ........................ 349/153 |

(Continued)

FOREIGN PATENT DOCUMENTS

| CN | 1151025 A | 6/1997 |
| JP | 2007-322574 A | 12/2007 |

(Continued)

OTHER PUBLICATIONS

International Search Report received for PCT Patent Application No. PCT/JP2010/066538, mailed on Oct. 26, 2010, 6 pages (2 pages of English translation and 4 pages of PCT Search Report).

*Primary Examiner* — Joseph Feild  
*Assistant Examiner* — Henok Heyi  
(74) *Attorney, Agent, or Firm* — Morrison & Foerster LLP

(57) ABSTRACT

A display element (10) includes an upper substrate (first substrate) (2), a lower substrate (second substrate) (3), and a conductive liquid (16) that is sealed in a display space (S) formed between the upper substrate (2) and the lower substrate (3) so as to be moved toward an effective display region (P1) or a non-effective display region (P2). The conductive liquid (16) is colored black. The non-effective display (P2) is defined by a black matrix (light-shielding layer) (11s) provided on the upper substrate (2), and the effective display region (P1) is defined by a color filter (aperture) (11r) formed in the black matrix (11s). The size of the black matrix (11s) is determined based on the size of each of ribs (14a, 14b) and a gap size (H) between the upper substrate (2) and the lower substrate (3).

8 Claims, 11 Drawing Sheets

(56) References Cited

U.S. PATENT DOCUMENTS

| | | | |
|---|---|---|---|
| 2008/0055500 A1* | 3/2008 | Maeda | 349/15 |
| 2008/0143898 A1* | 6/2008 | Ogishima et al. | 349/33 |
| 2009/0195738 A1* | 8/2009 | Yamada et al. | 349/110 |
| 2009/0213452 A1 | 8/2009 | Lin et al. | |
| 2010/0110350 A1* | 5/2010 | Katoh | 349/110 |
| 2010/0177022 A1* | 7/2010 | Teranishi et al. | 345/72 |
| 2010/0182290 A1 | 7/2010 | Matsuoka et al. | |
| 2011/0292491 A1* | 12/2011 | Ueki et al. | 359/295 |

FOREIGN PATENT DOCUMENTS

| | | |
|---|---|---|
| WO | 2007/013682 A1 | 2/2007 |
| WO | 2007/064141 A1 | 6/2007 |
| WO | 2008/155925 A1 | 12/2008 |
| WO | 2008/155926 A1 | 12/2008 |

* cited by examiner

DISPLAY ELEMENT AND ELECTRICAL DEVICE USING THE SAME

CROSS REFERENCE TO RELATED APPLICATIONS

This is a U.S. National Phase patent application of PCT/JP2010/066538, filed Sep. 24, 2010, which claims priority to Japanese Patent Application No. 2009-284194, filed Dec. 15, 2009, each of which is hereby incorporated by reference in the present disclosure in its entirety.

TECHNICAL FIELD

The present invention relates to a display element that displays information such as images and characters by moving a conductive liquid, and an electrical device using the display element.

BACKGROUND ART

In recent years, as typified by an electrowetting type display element, a display element that displays information by utilizing a transfer phenomenon of a conductive liquid due to an external electric field has been developed and put to practical use.

Specifically, in such a conventional display element, a display space is formed between first and second substrates, and the inside of the display space is divided by ribs (partitions) in accordance with a plurality of pixel regions (see, e.g., Patent Document 1). Moreover, a conductive liquid is sealed in each of the pixel regions, and signal electrodes are arranged so as to cross scanning electrodes and standard electrodes (reference electrodes) that are parallel to each other. In each of the pixel regions of this conventional display element, a non-effective display region is defined by a light-shielding layer provided on one of the first and second substrates, and an effective display region is defined by an aperture formed in the light-shielding layer.

Further, the conductive liquid is colored, e.g., black and used as a shutter for the aperture. In the conventional display element, voltages are appropriately applied to the signal electrodes, the scanning electrodes, and the standard electrodes, so that the conductive liquid is moved to the non-effective display region (non-aperture region) side or the effective display region (aperture) side in each of the pixel regions, thereby changing the display color on a display surface.

PRIOR ART DOCUMENTS

Patent Documents

Patent Document 1: WO 2008/155926 A1

DISCLOSURE OF INVENTION

Problem to be Solved by the Invention

However, the above conventional display element can cause a problem that the display quality is reduced when the display element is seen from an oblique direction.

Specifically, in the conventional display element, there are some cases where the conductive liquid that has been moved to the aperture side does not fully cover the aperture when the display element is seen from an oblique direction, e.g., depending on the contact angles between the conductive liquid and each of the first and second substrates. Therefore, when the conventional display element is seen from an oblique direction, light is not completely blocked by the conductive liquid and can be visually recognized. In other words, when the conventional display element is seen from an oblique direction, the conductive liquid may not sufficiently function as a shutter, which may lead to the leakage of light. Consequently, the conventional display element can reduce the contrast and thus reduce the display quality when it is seen from an oblique direction.

With the foregoing in mind, it is an object of the present invention to provide a display element that can prevent a reduction in display quality even when the display element is seen from an oblique direction, and an electrical device using the display element.

Means for Solving Problem

To achieve the above object, a display element of the present invention includes the following: a first substrate provided on a display surface side; a second substrate provided on a non-display surface side of the first substrate so that a predetermined display space is formed between the first substrate and the second substrate; an effective display region and a non-effective display region that are defined with respect to the display space; and a conductive liquid sealed in the display space so as to be moved toward the effective display region or the non-effective display region. The display element is capable of changing a display color on the display surface side by moving the conductive liquid. The display element includes the following: a plurality of signal electrodes that are placed in the display space so as to come into contact with the conductive liquid, and are also provided along a predetermined arrangement direction; a plurality of reference electrodes that are provided on one of the first substrate and the second substrate so as to be electrically insulated from the conductive liquid and to be located on one of the effective display region side and the non-effective display region side, and are also arranged so as to intersect with the plurality of the signal electrodes; a plurality of scanning electrodes that are provided on one of the first substrate and the second substrate so as to be electrically insulated from the conductive liquid and the plurality of the reference electrodes and to be located on the other of the effective display region side and the non-effective display region side, and are also arranged so as to intersect with the plurality of the signal electrodes; a plurality of pixel regions that are located at each of the intersections of the plurality of the signal electrodes and the plurality of the scanning electrodes; and ribs that are provided on at least one of the first substrate and the second substrate so as to partition the inside of the display space in accordance with each of the plurality of the pixel regions. The conductive liquid is colored a predetermined color. The non-effective display region is defined by a light-shielding layer provided on at least one of the first substrate and the second substrate, and the effective display region is defined by an aperture formed in the light-shielding layer. The size of the light-shielding layer is determined based on the size of each of the ribs and a gap size between the first substrate and the second substrate.

In the display element having the above configuration, the non-effective display region is defined by the light-shielding layer provided on at least one of the first substrate and the second substrate, and the effective display region is defined by the aperture formed in the light-shielding layer. Moreover, the size of the light-shielding layer is determined based on the size of each of the ribs and the gap size between the first substrate and the second substrate. Thus, unlike the conventional example, the conductive liquid that has been moved to the aperture (effective display region) side can cover the aperture regardless of the contact angles between the conductive liquid and each of the first substrate and the second substrate even when the display element is seen from an oblique direction. Therefore, light can be sufficiently blocked by the conductive liquid and the light-shielding layer even when the display element is seen from an oblique direction. Consequently, the display element can prevent a reduction in contrast as well as in display quality even when it is seen from an oblique direction.

In the above display element, the light-shielding layer may be provided on one of the first substrate and the second substrate, and in each of the plurality of the pixel regions, a width W1 of the light-shielding layer may be set so as to satisfy the following inequality (1):

$$R/2 + H/2 \leq W1 \quad (1)$$

where R represents the width of each of the ribs and H represents the gap size between the first substrate and the second substrate.

In this case, light can be sufficiently blocked by the conductive liquid and the light-shielding layer provided on one of the first substrate and the second substrate in each of the pixel regions even when the display element is seen from an oblique direction at the time the conductive liquid has been moved to the aperture side.

In the above display element, the light-shielding layer may be provided on both the first substrate and the second substrate, and in each of the plurality of the pixel regions, a width W2 of the light-shielding layer may be set so as to satisfy the following inequality (2):

$$R/2 + H/4 W2 \quad (2)$$

where R represents the width of each of the ribs and H represents the gap size between the first substrate and the second substrate.

In this case, light can be sufficiently blocked by the conductive liquid and the light-shielding layer provided on both the first substrate and the second substrate in each of the pixel regions even when the display element is seen from an oblique direction at the time the conductive liquid has been moved to the aperture side.

In the above display element, it is preferable that the display element includes the following: a signal voltage application portion that is connected to the plurality of the signal electrodes and applies a signal voltage in a predetermined voltage range to each of the signal electrodes in accordance with information to be displayed on the display surface side; a reference voltage application portion that is connected to the plurality of the reference electrodes and applies one of a selected voltage and a non-selected voltage to each of the reference electrodes, the selected voltage allowing the conductive liquid to move in the display space in accordance with the signal voltage and the non-selected voltage inhibiting a movement of the conductive liquid in the display space; and a scanning voltage application portion that is connected to the plurality of the scanning electrodes and applies one of a selected voltage and a non-selected voltage to each of the scanning electrodes, the selected voltage allowing the conductive liquid to move in the display space in accordance with the signal voltage and the non-selected voltage inhibiting a movement of the conductive liquid in the display space.

In this case, a matrix-driven display element with excellent display quality can be easily provided, and the display color in each of the pixel regions can be appropriately changed.

In the above display element, the plurality of the pixel regions may be provided in accordance with a plurality of colors that enable full-color display to be shown on the display surface side.

In this case, the color image display can be performed by moving the corresponding conductive liquid properly in each of the pixels.

In the above display element, it is preferable that an insulating fluid that is not mixed with the conductive liquid is movably sealed in the display space.

In this case, the speed of movement of the conductive liquid can be easily improved.

In the above display element, it is preferable that a dielectric layer is formed on the surfaces of the plurality of the reference electrodes and the plurality of the scanning electrodes.

In this case, the dielectric layer reliably increases the electric field applied to the conductive liquid, so that the speed of movement of the conductive liquid can be more easily improved.

An electrical device of the present invention includes a display portion that displays information including characters and images. The display portion includes any of the above display elements.

In the electrical device having the above configuration, the display portion uses the display element that can prevent a reduction in display quality even when the display element is seen from an oblique direction. Thus, the electrical device with excellent display performance can be easily provided.

Effects of the Invention

The present invention can provide a display element that can prevent a reduction in display quality even when the display element is seen from an oblique direction, and an electrical device using the display element.

BRIEF DESCRIPTION OF DRAWINGS

FIG. 7 is a diagram for explaining the results of a comparison of a product of this embodiment with a conventional product.

DESCRIPTION OF THE INVENTION

Figure 1:
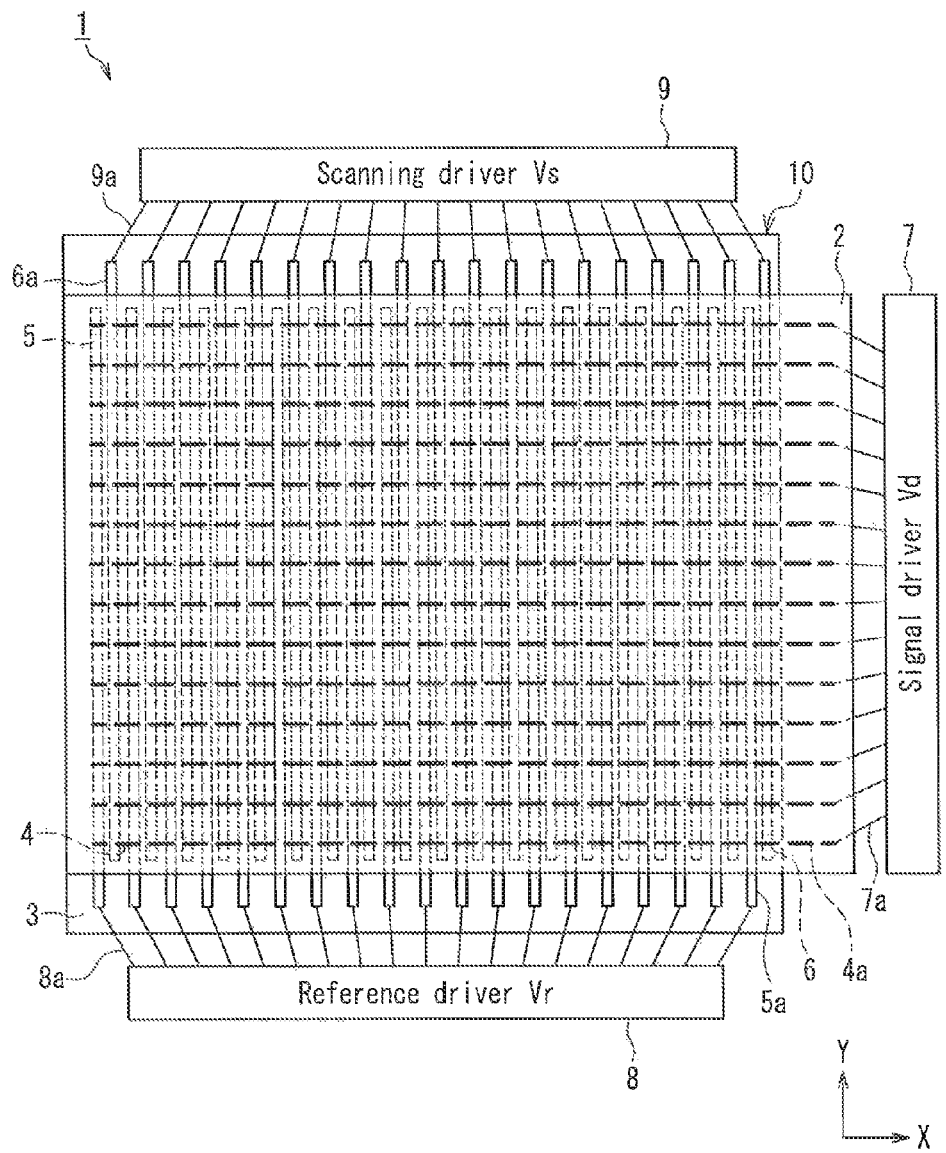
FIG. 1 is plan view for explaining a display element and an image display apparatus of Embodiment 1 of the present invention.

Hereinafter, preferred embodiments of a display element and an electrical device of the present invention will be described with reference to the drawings. In the following description, the present invention is applied to an image display apparatus including a display portion that can display color images. The size and size ratio of each of the constituent members in the drawings do not exactly reflect those of the actual constituent members.

[Embodiment 1]

FIG. 1 is a plan view for explaining a display element and an image display apparatus of Embodiment 1 of the present invention. In FIG. 1, an image display apparatus 1 of this embodiment includes a display portion using a display element 10 of the present invention. The display portion has a rectangular display surface. The display element 10 includes an upper substrate 2 and a lower substrate 3 that are arranged to overlap each other in a direction perpendicular to the sheet of FIG. 1. The overlap between the upper substrate 2 and the lower substrate 3 forms an effective display region of the display surface (as will be described in detail later).

In the display element 10, a plurality of signal electrodes 4 are spaced at predetermined intervals and arranged in stripes in the X direction. Moreover, in the display element 10, a plurality of reference electrodes 5 and a plurality of scanning electrodes 6 are alternately arranged in stripes in the Y direction. The plurality of the signal electrodes 4 intersect with the plurality of the reference electrodes 5 and the plurality of the scanning electrodes 6, and a plurality of pixel regions are located at each of the intersections of the signal electrodes 4 and the scanning electrodes 6.

The signal electrodes 4, the reference electrodes 5, and the scanning electrodes 6 are configured so that voltages can be independently applied to these electrodes, and the voltages fall in a predetermined voltage range between a High voltage (referred to as "H voltage" in the following) that serves as a first voltage and a Low voltage (referred to as "L voltage" in the following) that serves as a second voltage (as will be described in detail later).

In the display element 10, the pixel regions are separated from one another by partitions and provided in accordance with a plurality of colors that enable full-color display to be shown on the display surface, as will be described in detail later. The display element 10 changes the display color on the display surface by moving a conductive liquid (as will be described later) for each of a plurality of pixels (display cells) arranged in a matrix using an electrowetting phenomenon.

One end of the signal electrodes 4, the reference electrodes 5, and the scanning electrodes 6 are extended to the outside of the effective display region of the display surface and form terminals 4a, 5a, and 6a, respectively.

A signal driver 7 is connected to the individual terminals 4a of the signal electrodes 4 via wires 7a. The signal driver 7 constitutes a signal voltage application portion and applies a signal voltage Vd to each of the signal electrodes 4 in accordance with information when the image display apparatus 1 displays the information including characters and images on the display surface.

A reference driver 8 is connected to the individual terminals 5a of the reference electrodes 5 via wires 8a. The reference driver 8 constitutes a reference voltage application portion and applies a reference voltage Vr to each of the reference electrodes 5 when the image display apparatus 1 displays the information including characters and images on the display surface.

A scanning driver 9 is connected to the individual terminals 6a of the scanning electrodes 6 via wires 9a. The scanning driver 9 constitutes a scanning voltage application portion and applies a scanning voltage Vs to each of the scanning electrodes 6 when the image display apparatus 1 displays the information including characters and images on the display surface.

The scanning driver 9 applies either a non-selected voltage or a selected voltage to each of the scanning electrodes 6 as the scanning voltage Vs. The non-selected voltage inhibits the movement of the conductive liquid and the selected voltage allows the conductive liquid to move in accordance with the signal voltage Vd. Moreover, the reference driver 8 is operated with reference to the operation of the scanning driver 9. The reference driver 8 applies either the non-selected voltage that inhibits the movement of the conductive liquid or the selected voltage that allows the conductive liquid to move in accordance with the signal voltage Vd to each of the reference electrodes 5 as the reference voltage Vr.

In the image display apparatus 1, the scanning driver 9 applies the selected voltage to each of the scanning electrodes 6 in sequence, e.g., from the left to the right of FIG. 1, and the reference driver 8 applies the selected voltage to each of the reference electrodes 5 in sequence from the left to the right of FIG. 1 in synchronization with the operation of the scanning driver 9. Thus, the scanning driver 9 and the reference driver 8 perform their respective scanning operations for each line (as will be described in detail later).

The signal driver 7, the reference driver 8, and the scanning driver 9 include a direct-current power supply or an alternating-current power supply that supplies the signal voltage Vd, the reference voltage Vr, and the scanning voltage Vs, respectively.

The reference driver 8 switches the polarity of the reference voltage Vr at predetermined time intervals (e.g., 1 frame). Moreover, the scanning driver 9 switches the polarity of the scanning voltage Vs in accordance with the switching of the polarity of the reference voltage Vr. Thus, since the polarities of the reference voltage Vr and the scanning voltage Vs are switched at predetermined time intervals, the localization of charges in the reference electrodes 5 and the scanning electrodes 6 can be prevented, compared to the case where the voltages with the same polarity are always applied to the reference electrodes 5 and the scanning electrodes 6. Moreover, it is possible to prevent the adverse effects of a display failure (after-image phenomenon) and low reliability (a reduction in life) due to the localization of charges.

The pixel structure of the display element 10 will be described in detail with reference to FIGS. 2 to 4 as well as FIG. 1.

Figure 2:
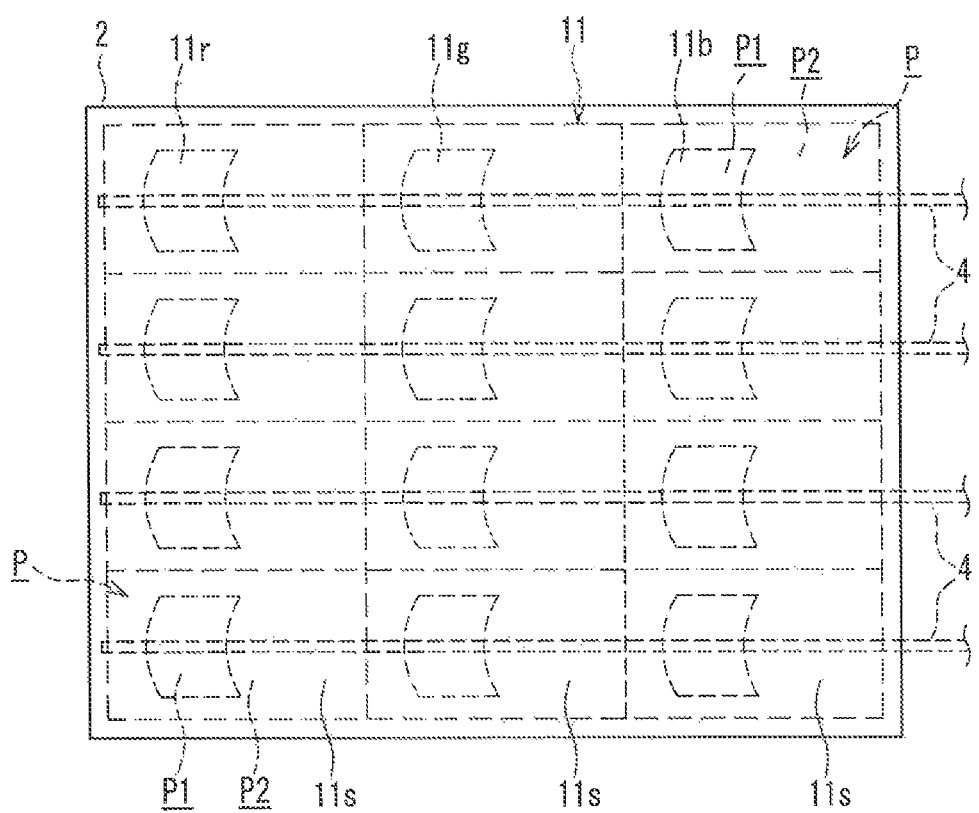
FIG. 2 is an enlarged plan view showing the main configuration of the upper substrate in FIG. 1 when viewed from a display surface side.

FIG. 2 is an enlarged plan view showing the main configuration of the upper substrate in FIG. 1 when viewed from the display surface side. FIG. 3 is an enlarged plan view showing the main configuration of the lower substrate in FIG. 1 when viewed from the non-display surface side. FIGS. 4A and 4B are cross-sectional views showing the main configuration of the display element in FIG. 1 during non-CF color display and CF color display, respectively. For the sake of simplification, FIGS. 2 and 3 show twelve pixels placed at the upper left corner of the plurality of pixels on the display surface in FIG. 1.

Figure 3:
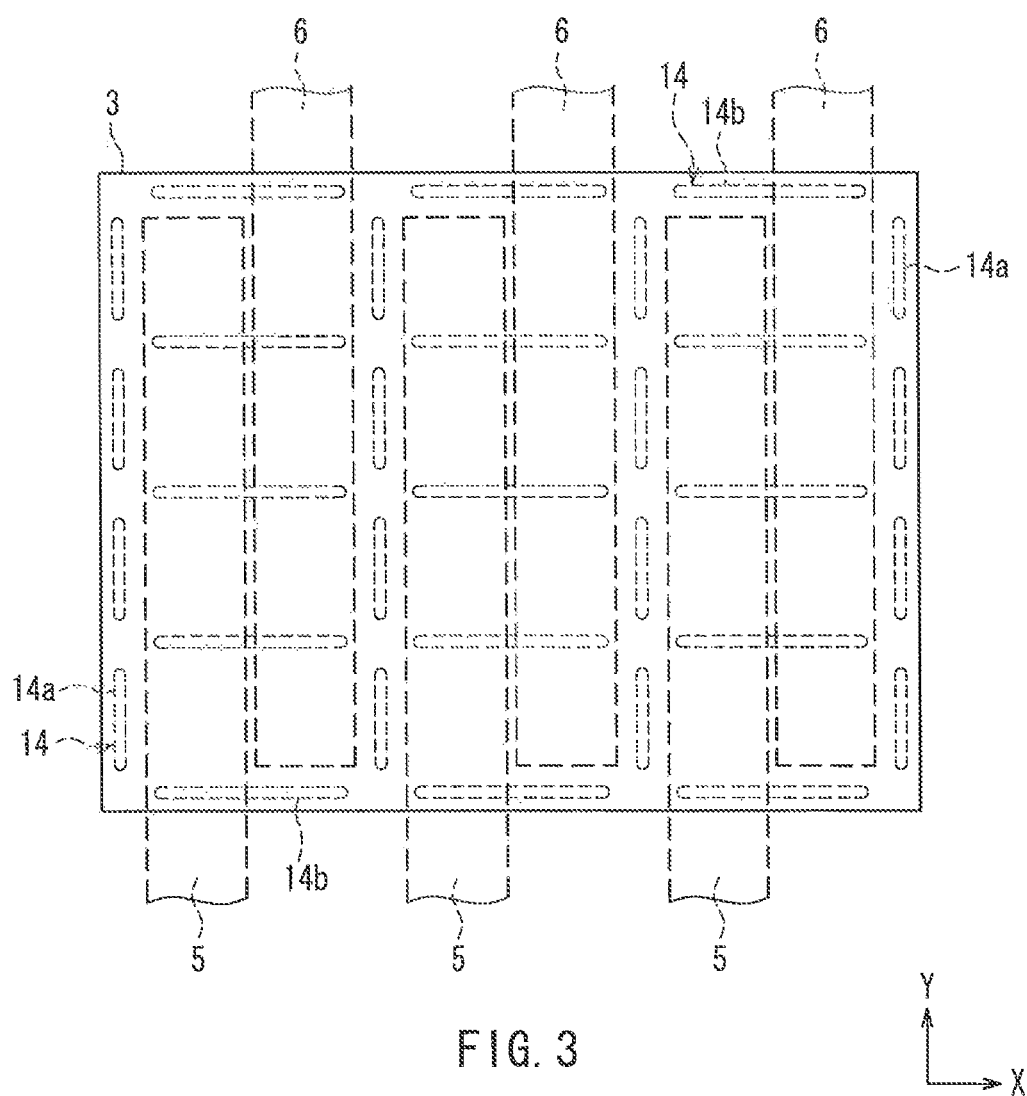
FIG. 3 is an enlarged plan view showing the main configuration of the lower substrate in FIG. 1 when viewed from a non-display surface side.
Figure 4A:
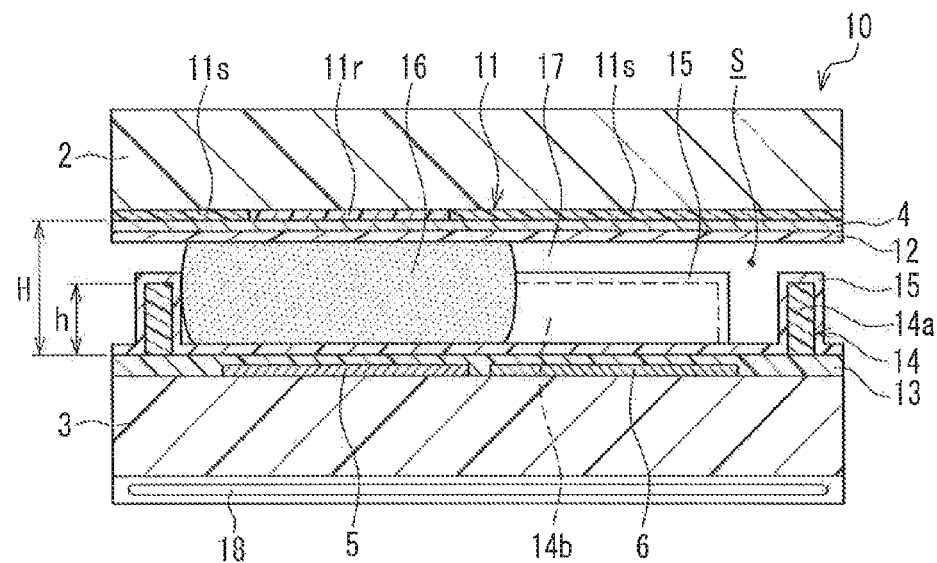
FIGS. 4A and 4B are cross-sectional views showing the main configuration of the display element in FIG. 1 during non-CF color display and CF color display, respectively.
Figure 4B:
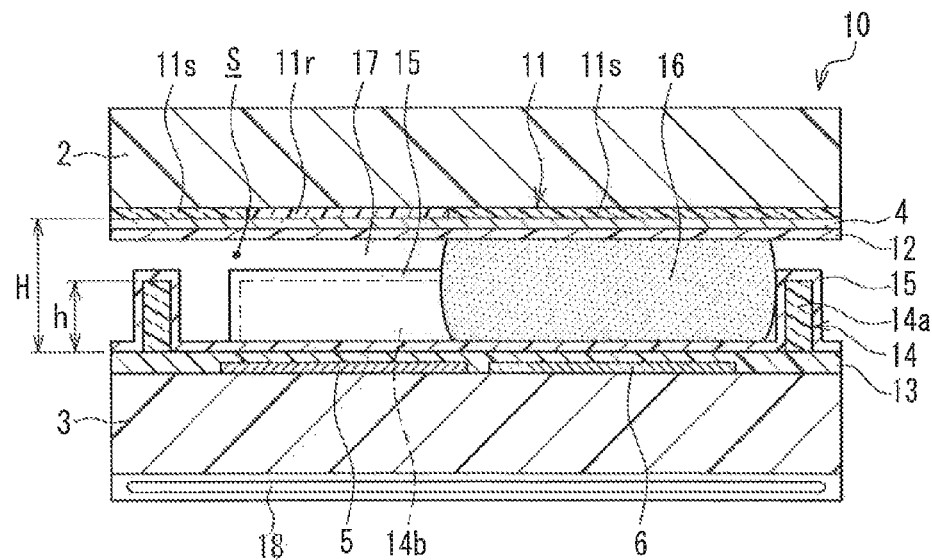

In FIGS. 2 to 4, the display element 10 includes the upper substrate 2 that is provided on the display surface side and serves as a first substrate, and the lower substrate 3 that is provided on the back (i.e., the non-display surface side) of the upper substrate 2 and serves as a second substrate. In the display element 10, the upper substrate 2 and the lower substrate 3 are located at a predetermined distance away from each other, so that a predetermined display space S is formed between the upper substrate 2 and the lower substrate 3. The conductive liquid 16 and an insulating oil 17 that is not mixed with the conductive liquid 16 are sealed in the display space S and can be moved in the X direction (the lateral direction of FIG. 4). The conductive liquid 16 can be moved toward an effective display region P1 or a non-effective display region P2, as will be described later.

The conductive liquid 16 can be, e.g., an aqueous solution including water as a solvent and a predetermined electrolyte as a solute. Specifically, 1 mmol/L of potassium chloride (KCl) aqueous solution may be used as the conductive liquid 16. Moreover, the conductive liquid 16 is colored a predetermined color, e.g., black with a self dispersible pigment.

The conductive liquid 16 is colored black and therefore functions as a shutter that allows or prevents light transmission. When the conductive liquid 16 is slidably moved in the display space S toward the reference electrode 5 (i.e., the effective display region P1) or the scanning electrode 6 (i.e., the non-effective display region P2), the display color of each pixel of the display element 10 is changed to black or any color of RBG, as will be described in detail later.

The oil 17 can be, e.g., a nonpolar, colorless, and transparent oil including one or more than one selected from a sidechain higher alcohol, a side-chain higher fatty acid, an alkane hydrocarbon, a silicone oil, and a matching oil. The oil 17 is shifted in the display space S as the conductive liquid 16 is slidably moved.

The upper substrate 2 can be, e.g., a transparent glass material such as a non-alkali glass substrate or a transparent sheet material such as a transparent synthetic resin (e.g., an acrylic resin). A color filter layer 11 and the signal electrodes 4 are formed in this order on the surface of the upper substrate 2 that faces the non-display surface side. Moreover, a hydrophobic film 12 is formed to cover the color filter layer 11 and the signal electrodes 4.

Like the upper substrate 2, the lower substrate 3 can be, e.g., a transparent glass material such as a non-alkali glass substrate or a transparent sheet material such as a transparent synthetic resin (e.g., an acrylic resin). The reference electrodes 5 and the scanning electrodes 6 are provided on the surface of the lower substrate 3 that faces the display surface side. Moreover, a dielectric layer 13 is formed to cover the reference electrodes 5 and the scanning electrodes 6. Ribs 14a and 14b are formed parallel to the Y direction and the X direction, respectively, on the surface of the dielectric layer 13 that faces the display surface side. In the lower substrate 3, a hydrophobic film 15 is further formed to cover the dielectric layer 13 and the ribs 14a, 14b.

A backlight 18 that emits, e.g., white illumination light is integrally attached to the back (i.e., the non-display surface side) of the lower substrate 3, thus providing a transmission type display element 10. The backlight 18 uses a light source such as a cold cathode fluorescent tube or a LED.

The color filter layer 11 includes red (R), green (G), and blue (B) color filters 11r, 11g, and 11b and a black matrix 11s serving as a light-shielding layer, thereby constituting the pixels of R, G, and B colors. In the color filter layer 11, as shown in FIG. 2, the R, G, and B color filters 11r, 11g, and 11b are successively arranged in columns in the X direction, and each column includes four color filters in the Y direction. Thus, a total of twelve pixels are arranged in three columns (the X direction) and four rows (the Y direction).

As shown in FIG. 2, in each of the pixel regions P of the display element 10, any of the R, G, and B color filters 11r, 11g, and 11b is provided in a portion corresponding to the effective display region P1 and the black matrix 11s is provided in a portion corresponding to the non-effective display region P2 of the pixel. In other words, with respect to the display space S, the non-effective display region (non-aperture region) P2 is defined by the black matrix (light-shielding layer) 11s and the effective display region P1 is defined by an aperture (i.e., any of the color filters 11r, 11g, and 11b) formed in that black matrix 11s.

In the display element 10, the area of each of the color filters 11r, 11g, and 11b is the same as or slightly smaller than that of the effective display region P1. On the other hand, the area of the black matrix 11s is the same as or slightly larger than that of the non-effective display region P2. In FIG. 2, the boundary between two black matrixes 11s corresponding to the adjacent pixels is indicated by a dotted line to clarify the boundary between the adjacent pixels. Actually, however, no boundary is present between the black matrixes 11s of the color filter layer 11.

Moreover, in each of the pixel regions P of the display element 10, the size of the black matrix (light-shielding layer) 11s is determined based on the size of each of the ribs 14a, 14b and a gap size between the upper substrate 2 and the lower substrate 3 so as to prevent a reduction in display quality even when the display element 10 is seen from an oblique direction at the time the conductive liquid 16 has been moved to the aperture (effective display region P1) side, as will be described in detail later. In addition, the black matrix 11s is provided so that the aperture ratio of the aperture is maximized in each of the pixel regions P of the display element 10 (as will be described in detail later).

In the display element 10, the display space S is divided into the pixel regions P by the ribs 14a, 14b serving as the partitions as described above. Specifically, as shown in FIG. 3, the display space S of each pixel is partitioned by two opposing ribs 14a and two opposing ribs 14b. Moreover, in the display element 10, the ribs 14a, 14b prevent the conductive liquid 16 from flowing into the display space S of the adjacent pixel regions P. The ribs 14a, 14b are made of, e.g., an epoxy resin resist material, and the height of the ribs 14a, 14b protruding from the dielectric layer 13 (i.e., the rib height) is determined so as to prevent the flow of the conductive liquid 16 between the adjacent pixels.

Specifically, as shown in FIGS. 4A and 4B, the height h of the ribs 14a, 14b protruding from the dielectric layer 13 (i.e., the rib height) is set to about 60 to 90% of the gap size H between the upper substrate 2 and the lower substrate 3, i.e., the distance between the color filter layer 11 and the dielectric layer 13. With this configuration, the conductive liquid 16 can be moved at a high speed toward the effective display region P1 or the non-effective display region P2. Moreover, this configuration also can reliably prevent the conductive liquid 16 from entering the adjacent pixel regions P when the conductive liquid 16 is moved.

The hydrophobic films 12, 15 are made of, e.g., a transparent synthetic resin, and preferably a fluoro polymer that functions as a hydrophilic layer for the conductive liquid 16 when a voltage is applied. This can significantly change the wettability (contact angle) between the conductive liquid 16 and each of the surfaces of the upper and lower substrates 2, 3 that face the display space S. Thus, the speed of movement of the conductive liquid 16 can be improved. The dielectric layer 13 can be, e.g., a transparent dielectric film containing parylene, a silicon nitride, a hafnium oxide, a zinc oxide, a titanium dioxide, or an aluminum oxide. A specific thickness of each of the hydrophobic films 12, 15 ranges from several tens of nanometers to several micrometers. A specific thickness of the dielectric layer 13 is several hundred nanometers. The hydrophobic film 12 does not electrically insulate the signal electrodes 4 from the conductive liquid 16, and therefore not interfere with the improvement in responsibility of the conductive liquid 16.

The reference electrodes 5 and the scanning electrodes 6 are made of, e.g., transparent electrode materials such as indium oxides (ITO), tin oxides ($SnO_2$), and zinc oxides (AZO, GZO, or IZO). The reference electrodes 5 and the scanning electrodes 6 are formed in stripes on the lower substrate 3 by a known film forming method such as sputtering.

The signal electrodes 4 can be, e.g., linear wiring that is arranged parallel to the X direction. The signal electrodes 4 are placed on the color filter layer 11 so as to extend substantially through the center of each of the pixel regions P in the Y direction, and further to come into electrical contact with the conductive liquid 16 via the hydrophobic film 12. This can improve the responsibility of the conductive liquid 16 during a display operation.

A material that is electrochemically inert to the conductive liquid 16 is used for the signal electrodes 4. Therefore, even if the signal voltage Vd (e.g., 40 V) is applied to the signal electrodes 4, the electrochemical reaction between the signal electrodes 4 and the conductive liquid 16 can be minimized. Thus, it is possible to prevent electrolysis of the signal electrodes 4 and to improve the reliability and life of the display element 10.

Specifically, the signal electrodes 4 are made of, e.g., an electrode material including at least one of gold, silver, copper, platinum, and palladium. The signal electrodes 4 may be formed by fixing thin wires made of the above metal material on the color filter layer 11 or by mounting an ink material such as a conductive paste containing the metal material on the color filter layer 11 with screen printing or the like.

The shape of the signal electrode 4 is determined using the transmittance of the reference electrode 5 located below the effective display region P1 of the pixel. Specifically, based on a transmittance of about 75% to 95% of the reference electrode 5, the shape of the signal electrode 4 is determined so that the occupation area of the signal electrode 4 on the effective display region P1 is 30% or less, preferably 10% or less, and more preferably 5% or less of the area of the effective display region P1.

In each pixel of the display element 10 having the above configuration, as shown in FIG. 4A, when the conductive liquid 16 is held between the color filter 11r and the reference electrode 5, light from the backlight 18 is blocked by the conductive liquid 16, so that the black display (non-CF color display) is performed. On the other hand, as shown in FIG. 4B, when the conductive liquid 16 is held between the black matrix 11s and the scanning electrode 6, light from the backlight 18 is not blocked by the conductive liquid 16 and passes through the color filter 11r, so that the red display (CF color display) is performed.

Hereinafter, setting of the size of the black matrix (light-shielding layer) 11s and the effect of the size setting will be described in detail with reference to FIGS. 5 to 7 as well as FIGS. 1 to 4.

Figure 5:
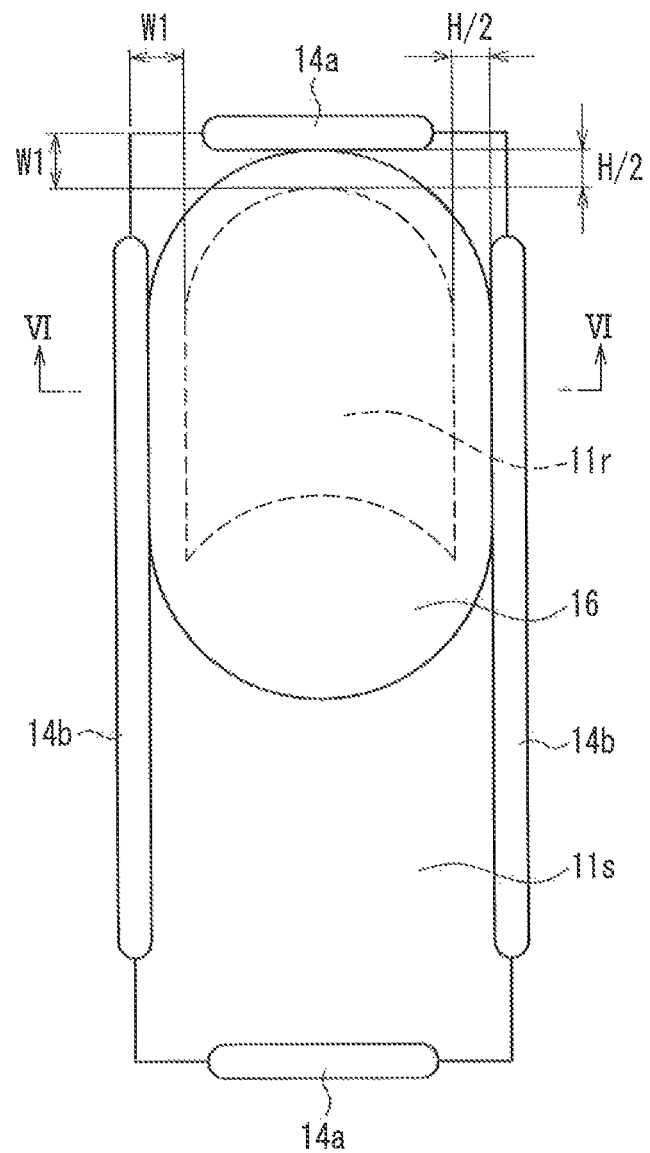
FIG. 5 is an enlarged plan view showing the main configuration in one pixel region of the display element.

FIG. 5 is an enlarged plan view showing the main configuration in one pixel region of the display element. FIG. 6 is a cross-sectional view taken along the line VI-VI in FIG. 5. FIG. 7 is a diagram for explaining the results of a comparison of a product of this embodiment with a conventional product, and FIGS. 7A and 7B show operation examples of the product of this embodiment and the conventional product, respectively. For the sake of simplification, the signal electrode 4, the reference electrode 5, the scanning electrode 6, and the hydrophobic films 12, 15 are omitted in FIGS. 6, 7A, and 7B (the same is true for FIGS. 9, 11, and 12 in the following).

Figure 6:
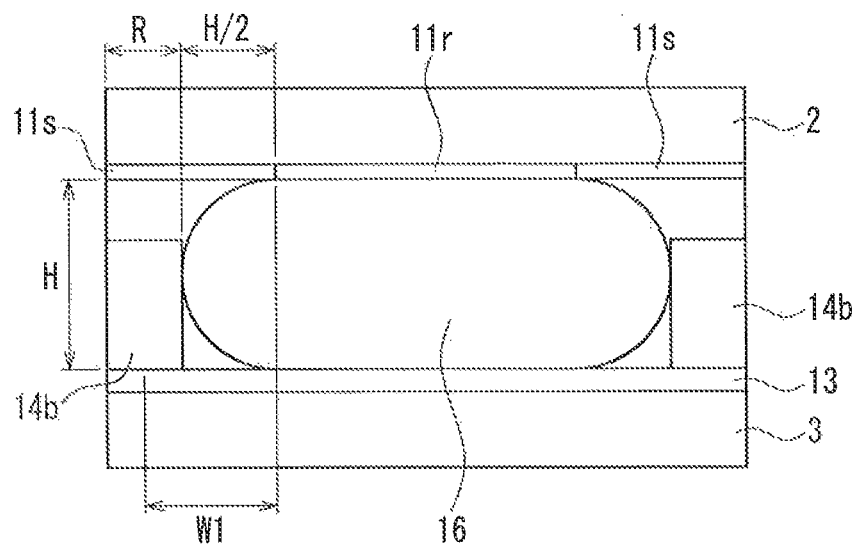
FIG. 6 is a cross-sectional view taken along the line VI-VI in FIG. 5.
Figure 7A:
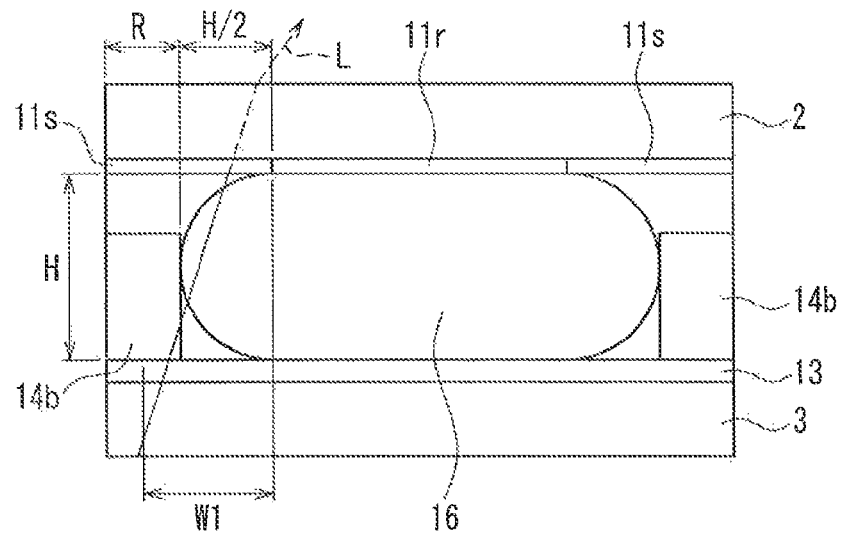
FIGS. 7A and 7B show operation examples of the product of this embodiment and the conventional product, respectively.
Figure 7B:
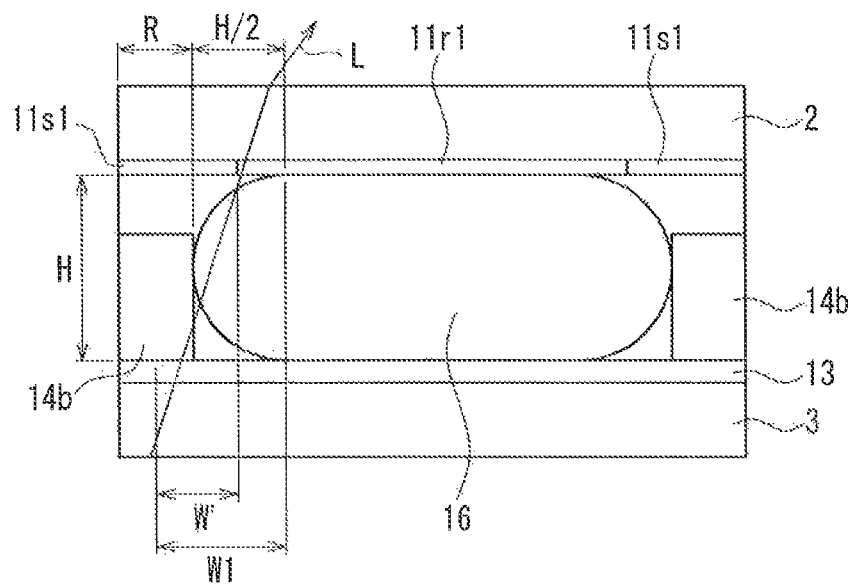

In the pixel region P shown in FIGS. 5 and 6, the size of the black matrix (light-shielding layer) 11s is determined based on the size of each of the ribs 14a, 14b and the gap size between the upper substrate 2 and the lower substrate 3.

Specifically, a width W1 of the black matrix 11s is set so as to satisfy the following inequality (1):

$$R/2 + H/2 \leq W1 \quad (1)$$

where R represents the width of each of the ribs 14a, 14b and H represents the gap size between the upper substrate 2 and the lower substrate 3.

In the display element 10 of this embodiment, the color filter 11r and the black matrix 11s are provided so that the aperture ratio of the color filter 11r, i.e., the aperture (effective display region P1) is maximized in the pixel region P. As shown in FIG. 5, in the portion of the color filter 11r that is parallel to the rib 14b, the width W1 of the black matrix 11s is set so as to satisfy the equality of the inequality (1), i.e., to be equal to R/2+H/2. The upper arc-shaped portion of the color filter 11r is provided in accordance with the shape of the conductive liquid 16 that has been moved to the effective display region P1 side, as shown in FIG. 5, and the color filter 11r and the black matrix 11s are provided so that the distance between the arc-shaped portion of the color filter 11r and the corresponding arc-shaped edge of the conductive liquid 16 remains constant at a value of H/2. Moreover, the lower arc-shaped portion of the color filter 11r is provided in accordance with the shape of the conductive liquid 16 that has been moved to the non-effective display region P2 side.

In the display element 10 of this embodiment, when the inequality (1) holds, as shown in FIG. 6, the conductive liquid 16 is in contact with the upper substrate 2 at a contact angle of 180 degrees in the boundary portions between the black matrix 11s and the color filter 11r, i.e., the right end of the black matrix 11s on the left side of FIG. 6 and the left end of the black matrix 11s on the right side of FIG. 6. Thus, in the display element 10 of this embodiment, the conductive liquid 16 that has been moved to the effective display region P1 side fully covers the color filter 11r, i.e., the aperture regardless of the contact angles between the conductive liquid 16 and each of the upper substrate 2 and the lower substrate 3.

More specifically, in the display element 10 of this embodiment, the width R of each of the ribs 14a, 14b is set, e.g., to 55 μm and the gap size H is set, e.g., to 100 μm. The width W1 of the black matrix 11s is set to 77.5 μm or more.

With the above configuration, in the product of this embodiment, as indicated by the arrow L in FIG. 7A, light can be sufficiently blocked by the conductive liquid 16 and the black matrix 11s even when the display element 10 is seen from an oblique direction.

On the other hand, in the conventional product, a width W' of a black matrix 11s1 is smaller than R/2+H/2, and does not satisfy the inequality (1). Therefore, in the conventional product, as indicated by the arrow L in FIG. 7B, light is not sufficiently blocked by the conductive liquid 16 and can be visually recognized by a user when the display element is seen from an oblique direction. In the conventional product shown in FIG. 7B, a color filter 11r1, i.e., the aperture is placed in a clearance between the right end of the width W' and the right end of the width W1, and the conductive liquid 16 does not fully cover the color filter 11r1, as shown in FIG. 7B. Thus, in the conventional product, light passing through the clearance is not sufficiently blocked by the conductive liquid 16 and can be visually recognized by a user. Consequently, the contrast is reduced, and the display quality also is reduced.

Next, a display operation of the image display apparatus 1 of this embodiment having the above configuration will be described in detail with reference to FIG. 8 as well as FIGS. 1 to 7.

Figure 8:
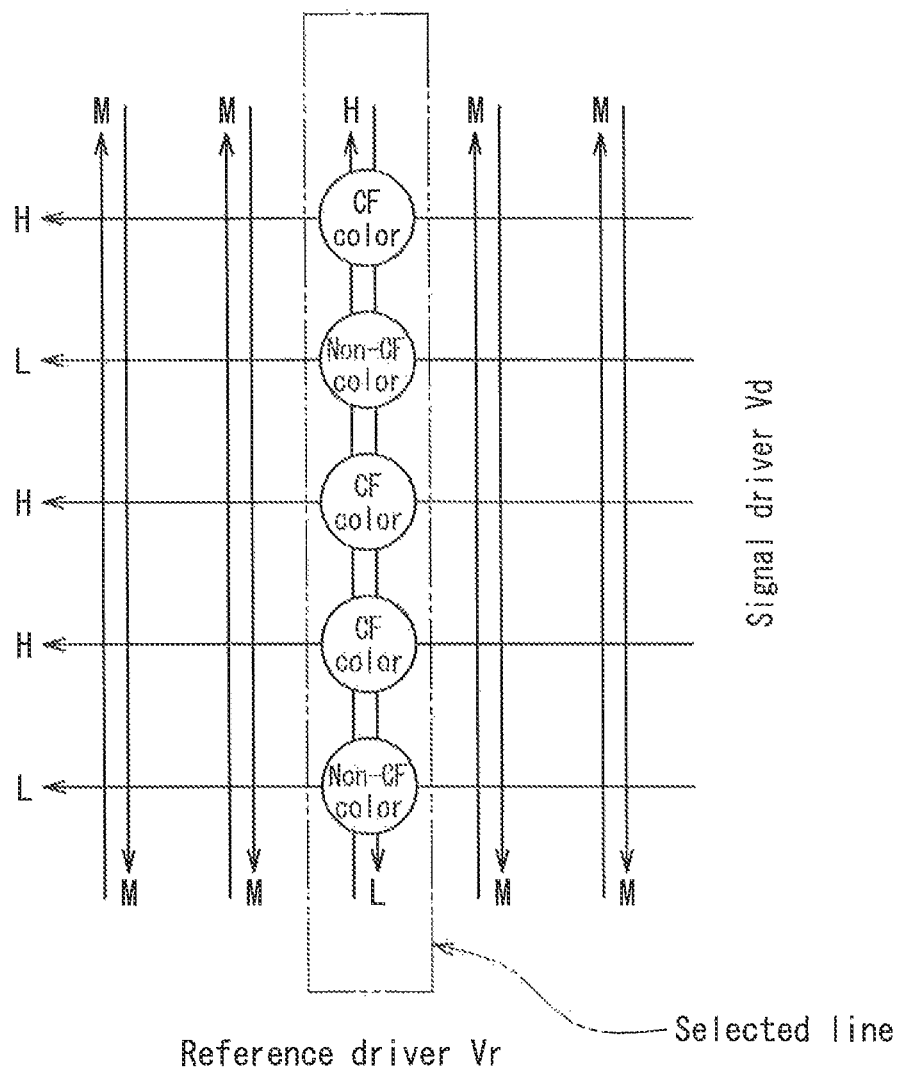
FIG. 8 is a diagram for explaining an operation example of the image display apparatus.

FIG. 8 is a diagram for explaining an operation example of the image display apparatus 1.

In FIG. 8, the reference driver 8 and the scanning driver 9 apply the selected voltages (i.e., the reference voltage Vr and the scanning voltage Vs) to the reference electrodes 5 and the scanning electrodes 6 in sequence in a predetermined scanning direction, e.g., from the left to the right of FIG. 8, respectively. Specifically, the reference driver 8 and the scanning driver 9 perform their scanning operations to determine a selected line by applying the H voltage (first voltage) and the L voltage (second voltage) as the selected voltages to the reference electrodes 5 and the scanning electrodes 6 in sequence, respectively. In this selected line, the signal driver 7 applies the H or L voltage (i.e., the signal voltage Vd) to the corresponding signal electrodes 4 in accordance with the external image input signal. Thus, in each of the pixels of the selected line, the conductive liquid 16 is moved toward the effective display region P1 or the non-effective display region P2, and the display color on the display surface is changed accordingly.

On the other hand, the reference driver 8 and the scanning driver 9 apply the non-selected voltages (i.e., the reference voltage Vr and the scanning voltage Vs) to non-selected lines, namely to all the remaining reference electrodes 5 and scanning electrodes 6, respectively. Specifically, the reference driver 8 and the scanning driver 9 apply, e.g., intermediate voltages (Middle voltages, referred to as "M voltages" in the following) between the H voltage and the L voltage as the non-selected voltages to all the remaining reference electrodes 5 and scanning electrodes 6, respectively. Thus, in each of the pixels of the non-selected lines, the conductive liquid 16 stands still without unnecessary displacement from the effective display region P1 or the non-effective display region P2, and the display color on the display surface is unchanged.

Table 1 shows the combinations of the voltages applied to the reference electrodes 5, the scanning electrodes 6, and the signal electrodes 4 in the above display operation. As shown in Table 1, the behavior of the conductive liquid 16 and the display color on the display surface depend on the applied voltages. In Table 1, the H voltage, the L voltage, and the M voltage are abbreviated to "H", "L", and "M", respectively (the same is true for Table 2 in the following). The specific values of the H voltage, the L voltage, and the M voltage are, e.g., +16 V, 0 V, and +8 V, respectively.

TABLE 1

| | Reference electrode | Scanning electrode | Signal electrode | Behavior of conductive liquid and display color on display surface |
|---|---|---|---|---|
| Selected line | H | L | H | The conductive liquid is moved toward the scanning electrode. CF color display |
| | | | L | The conductive liquid is moved toward the reference electrode. Black display |
| Non-selected line | M | M | H | The conductive liquid is still (not moving). Black or CF color display |
| | | | L | |

<Selected Line Operation>

In the selected line, e.g., when the H voltage is applied to the signal electrodes 4, there is no potential difference between the reference electrode 5 and the signal electrodes 4 because the H voltage is applied to both of these electrodes. On the other hand, a potential difference between the signal electrodes 4 and the scanning electrode 6 occurs because the L voltage is applied to the scanning electrode 6. Therefore, the conductive liquid 16 is moved in the display space S toward the scanning electrode 6 that makes a potential difference from the signal electrodes 4. Consequently, the conductive liquid 16 has been moved to the non-effective display region P2 side, as shown in FIG. 4B, and allows the illumination light emitted from the backlight 18 to reach the color filter 11r by shifting the oil 17 toward the reference electrode 5. Thus, the display color on the display surface becomes red display (i.e., the CF color display) due to the color filter 11r. In the image display apparatus 1, when the CF color display is performed in all the three adjacent R, G, and B pixels as a result of the movement of the conductive liquid 16 toward the non-effective display region P2, the red, green, and blue colors of light from the corresponding R, G, and B pixels are mixed into white light, resulting in the white display.

In the selected line, when the L voltage is applied to the signal electrodes 4, a potential difference occurs between the reference electrode 5 and the signal electrodes 4, but not between the signal electrodes 4 and the scanning electrode 6. Therefore, the conductive liquid 16 is moved in the display space S toward the reference electrode 5 that makes a potential difference from the signal electrodes 4. Consequently, the conductive liquid 16 has been moved to the effective display region P1 side, as shown in FIG. 4A, and prevents the illumination light emitted from the backlight 18 from reaching the color filter 11r. Thus, the display color on the display surface becomes black display (i.e., the non-CF color display) due to the presence of the conductive liquid 16.

<Non-Selected Line Operation>

In the non-selected lines, e.g., when the H voltage is applied to the signal electrodes 4, the conductive liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the L voltage is applied to the signal electrodes 4, the conductive liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4.

As described above, in the non-selected lines, the conductive liquid 16 is not moved, but stands still and the display color on the display surface is unchanged regardless of whether the H or L voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1, depending on the combinations of the applied voltages in Table 1, the display color of each pixel on the selected line can be, e.g., the CF colors (red, green, or blue) produced by the color filters 11$r$, 11$g$, and 11$b$ or the non-CF color (black) due to the conductive liquid 16 in accordance with the voltage applied to the signal electrodes 4 corresponding to the individual pixels, as shown in FIG. 8. When the reference driver 8 and the scanning driver 9 determine a selected line of the reference electrode 5 and the scanning electrode 6 by performing their scanning operations, e.g., from the left to the right of FIG. 8, the display colors of the pixels in the display portion of the image display apparatus 1 also are changed in sequence from the left to the right of FIG. 5. Therefore, if the reference driver 8 and the scanning driver 9 perform the scanning operations at a high speed, the display colors of the pixels in the display portion of the image display apparatus 1 also can be changed at a high speed. Moreover, by applying the signal voltage Vd to the signal electrodes 4 in synchronization with the scanning operation for the selected line, the image display apparatus 1 can display various information including dynamic images based on the external image input signal.

The combinations of the voltages applied to the reference electrodes 5, the scanning electrodes 6, and the signal electrodes 4 are not limited to Table 1, and may be as shown in Table 2.

TABLE 2

| | Reference electrode | Scanning electrode | Signal electrode | Behavior of conductive liquid and display color on display surface |
|---|---|---|---|---|
| Selected line | L | H | L | The conductive liquid is moved toward the scanning electrode. CF color display |
| | | | H | The conductive liquid is moved toward the reference electrode. Black display |
| Non-selected line | M | M | H | The conductive liquid is still (not moving). Black or CF color display |
| | | | L | |

The reference driver 8 and the scanning driver 9 perform their scanning operations to determine a selected line by applying the L voltage (second voltage) and the H voltage (first voltage) as the selected voltages to the reference electrodes 5 and the scanning electrodes 6 in sequence in a predetermined scanning direction, e.g., from the left to the right of FIG. 8, respectively. In this selected line, the signal driver 7 applies the H or L voltage (i.e., the signal voltage Vd) to the corresponding signal electrodes 4 in accordance with the external image input signal.

On the other hand, the reference driver 8 and the scanning driver 9 apply the M voltages as the non-selected voltages to the non-selected lines, namely to all the remaining reference electrodes 5 and scanning electrodes 6.

<Selected Line Operation>

In the selected line, e.g., when the L voltage is applied to the signal electrodes 4, there is no potential difference between the reference electrode 5 and the signal electrodes 4 because the L voltage is applied to both of these electrodes. On the other hand, a potential difference between the signal electrodes 4 and the scanning electrode 6 occurs because the H voltage is applied to the scanning electrode 6. Therefore, the conductive liquid 16 is moved in the display space S toward the scanning electrode 6 that makes a potential difference from the signal electrodes 4. Consequently, the conductive liquid 16 has been moved to the non-effective display region P2 side, as shown in FIG. 4B, and allows the illumination light emitted from the backlight 18 to reach the color filter 11$r$ by shifting the oil 17 toward the reference electrode 5. Thus, the display color on the display surface becomes red display (i.e., the CF color display) due to the color filter 11$r$. Like Table 1, when the CF color display is performed in all the three adjacent R, G, and B pixels, the white display is performed.

In the selected line, when the H voltage is applied to the signal electrodes 4, a potential difference occurs between the reference electrode 5 and the signal electrodes 4, but not between the signal electrodes 4 and the scanning electrode 6. Therefore, the conductive liquid 16 is moved in the display space S toward the reference electrode that makes a potential difference from the signal electrodes 4. Consequently, the conductive liquid 16 has been moved to the effective display region P1 side, as shown in FIG. 4A, and prevents the illumination light emitted from the backlight 18 from reaching the color filter 11$r$. Thus, the display color on the display surface becomes black display (i.e., the non-CF color display) due to the presence of the conductive liquid 16.

<Non-Selected Line Operation>

In the non-selected lines, e.g., when the L voltage is applied to the signal electrodes 4, the conductive liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4. Consequently, the display color is maintained without changing from the black display or the CF color display in the current state.

Similarly, in the non-selected lines, even when the H voltage is applied to the signal electrodes 4, the conductive liquid 16 stands still in the same position, and the current display color is maintained. Since the M voltages are applied to both the reference electrodes 5 and the scanning electrodes 6, the potential difference between the reference electrodes 5 and the signal electrodes 4 is the same as that between the scanning electrodes 6 and the signal electrodes 4.

In the non-selected lines, as shown in Table 2, similarly to Table 1, the conductive liquid 16 is not moved, but stands still and the display color on the display surface is unchanged regardless of whether the H or L voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1 of this embodiment, other than the combinations of the applied voltages shown in Tables 1 and 2, the voltage applied to the signal electrodes 4 not only has two values of the H voltage and the L voltage, but also may be changed between the H voltage and the L voltage in accordance with information to be displayed on the display surface. That is, the image display apparatus 1 can perform the gradation display by controlling the signal voltage Vd. Thus, the display element 10 can achieve excellent display performance.

In the display element 10 of this embodiment having the above configuration, the non-effective display region P2 is defined by the black matrix (light-shielding layer) 11s provided on the upper substrate (first substrate) 2, and the effective display region P1 is defined by the aperture formed in the black matrix 11s. Moreover, the size of the black matrix 11s is determined based on the size of each of the ribs 14a, 14b and the gap size between the upper substrate 2 and the lower substrate (second substrate) 3. Thus, in this embodiment, unlike the conventional example, the conductive liquid 16 that has been moved to the aperture (effective display region P1) side can cover the aperture regardless of the contact angles between the conductive liquid 16 and each of the upper substrate 2 and the lower substrate 3 even when the display element 10 is seen from an oblique direction, as shown in FIG. 7A. Therefore, in this embodiment, light can be sufficiently blocked by the conductive liquid 16 and the black matrix 11s even when the display element 10 is seen from an oblique direction. Consequently, the display element 10 of this embodiment can prevent a reduction in contrast as well as in display quality even when it is seen from an oblique direction.

In each of the pixel regions P of the display element 10 of this embodiment, the width W1 of the black matrix 11s is set so as to satisfy the inequality (1). Thus, in the display element 10 of this embodiment, light can be sufficiently blocked by the conductive liquid 16 and the black matrix 11s in each of the pixel regions P even when the display element 10 is seen from an oblique direction at the time the conductive liquid 16 has been moved to the aperture side.

In the image display apparatus (electrical device) 1 of this embodiment, the display portion uses the display element 10 that can prevent a reduction in display quality even when the display element 10 is seen from an oblique direction. Thus, the image display apparatus (electrical device) 1 with excellent display performance can be easily provided.

In the display element 10 of this embodiment, the signal driver (signal voltage application portion) 7, the reference driver (reference voltage application portion) 8, and the scanning driver (scanning voltage application portion) 9 apply the signal voltage Vd, the reference voltage Vr, and the scanning voltage Vs to the signal electrodes 4, the reference electrodes 5, and the scanning electrodes 6, respectively. Thus, in this embodiment, a matrix-driven display element 10 with excellent display quality can be easily provided, and the display color in each of the pixel regions can be appropriately changed.

[Embodiment 2]

Figure 9:
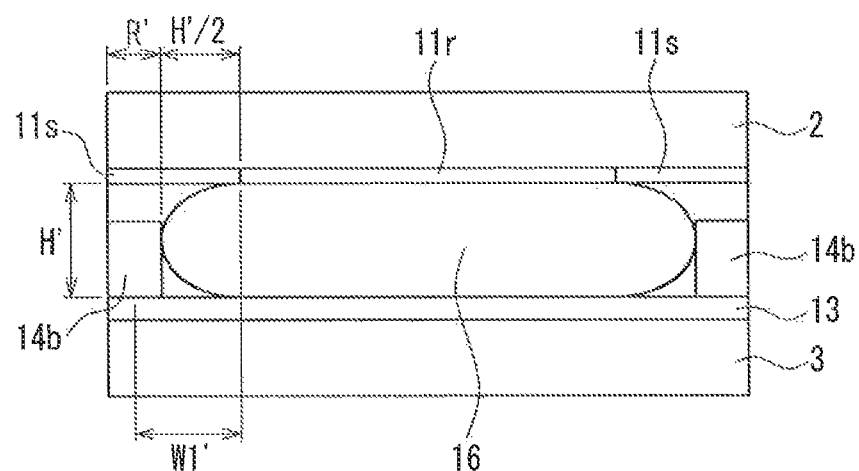
FIG. 9 is an enlarged cross-sectional view showing the main configuration in one pixel region of a display element of Embodiment 2 of this embodiment.

FIG. 9 is an enlarged cross-sectional view showing the main configuration in one pixel region of a display element of Embodiment 2 of this embodiment. In FIG. 9, this embodiment mainly differs from Embodiment 1 in that a width W1' is set so as to satisfy the following inequality (1)' by adjusting each of the parameters of the left-hand side of the inequality (1). The same components as those of Embodiment 1 are denoted by the same reference numerals, and the explanation will not be repeated.

As shown in FIG. 9, in the display element 10 of this embodiment, a gap size H' between the upper substrate 2 and the lower substrate 3 is smaller than the gap size in Embodiment 1. In the display element 10 of this embodiment, similarly to Embodiment 1, the width W1' of the black matrix 11s is set so as to satisfy the following inequality (1)':

$$R'/2 + H'/2 \leq W1' \quad (1)'$$

where R' represents the width of each of the ribs 14a, 14b.

In other words, the width W1' of the black matrix 11s is set so as to satisfy the inequality (1)' by adjusting each of the parameters (i.e., the rib width and the gap size) of the left-hand side of the inequality (1).

In the display element 10 of this embodiment, similarly to Embodiment 1, when the inequality (1)' holds, as shown in FIG. 9, the conductive liquid 16 is in contact with the upper substrate 2 at a contact angle of 180 degrees in the boundary portions between the black matrix 11s and the color filter 11r, i.e., the right end of the black matrix 11s on the left side of FIG. 9 and the left end of the black matrix 11s on the right side of FIG. 9. Thus, in the display element 10 of this embodiment, the conductive liquid 16 that has been moved to the effective display region P1 side fully covers the color filter 11r, i.e., the aperture regardless of the contact angles between the conductive liquid 16 and each of the upper substrate 2 and the lower substrate 3.

More specifically, in the display element 10 of this embodiment, the width R' of each of the ribs 14a, 14b is set, e.g., to 35 μm and the gap size H' is set, e.g., to 50 μm. The width W1 of the black matrix 11s is set to 42.5 μm or more.

With the above configuration, this embodiment can have effects comparable to those of Embodiment 1. Moreover, since the gap size H' of this embodiment is smaller than the gap size H of Embodiment 1, the utilization efficiency of the illumination light can be easily improved.

[Embodiment 3]

Figure 10A:
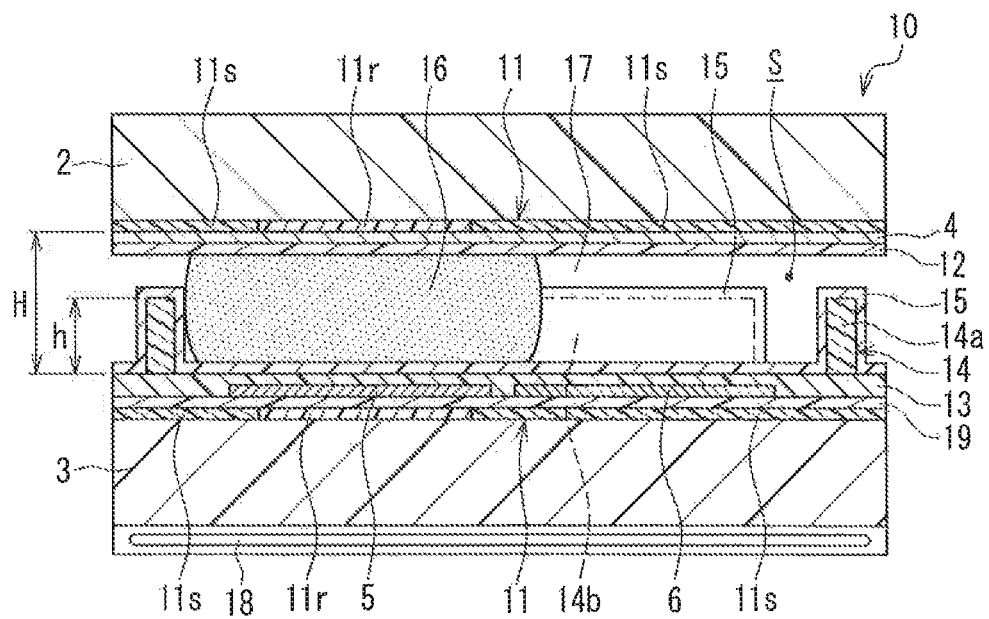
FIGS. 10A and 10B are cross-sectional views showing the main configuration of a display element of Embodiment 3 during non-CF color display and CF color display, respectively.
Figure 10B:
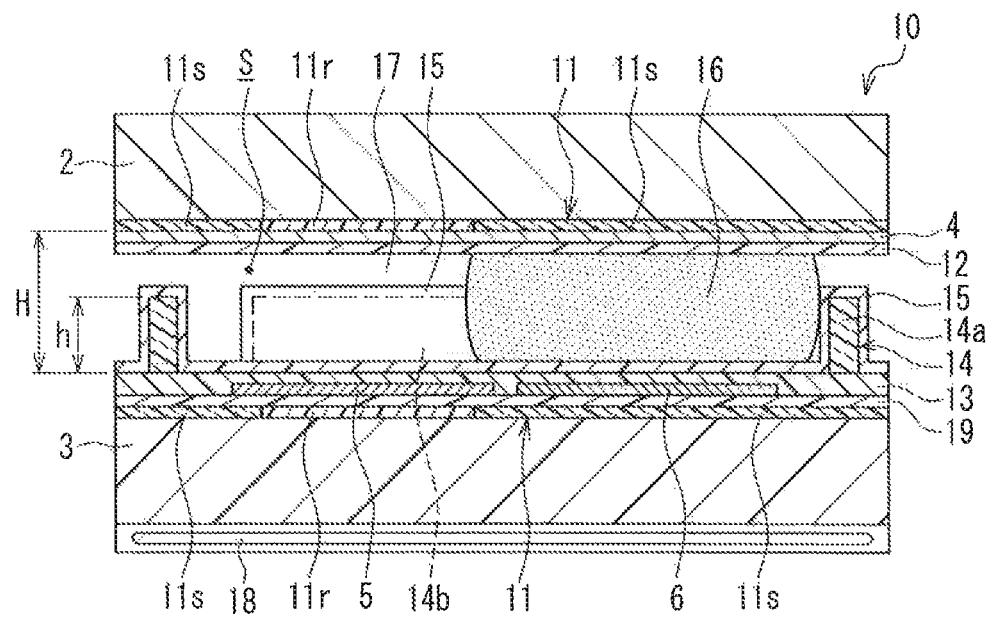
Figure 11:
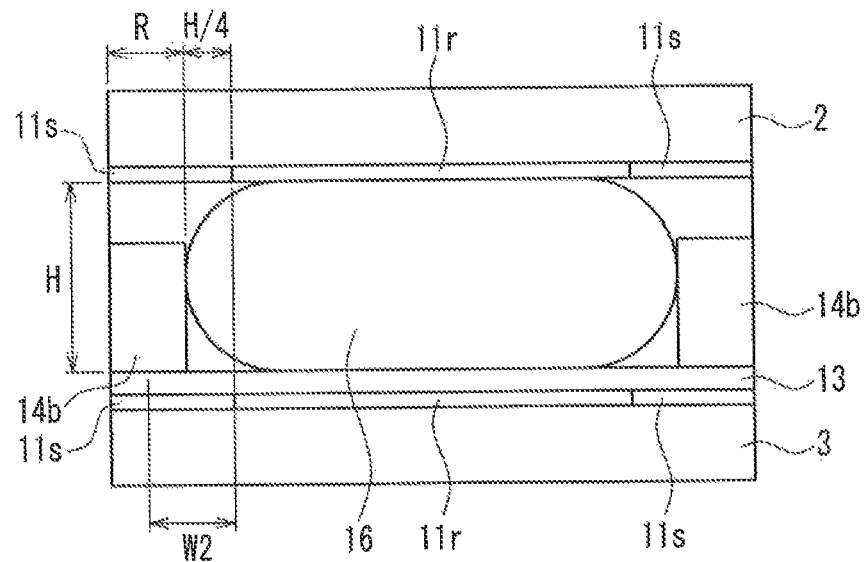
FIG. 11 is an enlarged cross-sectional view showing the main configuration in one pixel region of the display element shown in FIG. 10.

FIGS. 10A and 10B are cross-sectional views showing the main configuration of a display element of Embodiment 3 during non-CF color display and CF color display, respectively. FIG. 11 is an enlarged cross-sectional view showing the main configuration in one pixel region of the display element shown in FIG. 10. In FIGS. 10A, 10B, and 11, this embodiment mainly differs from Embodiment 1 in that a color filter layer including color filters and a black matrix is provided on both the upper substrate and the lower substrate, and that the width of the black matrix is set so as to satisfy the following inequality (2) in each of the pixel regions. The same components as those of Embodiment 1 are denoted by the same reference numerals, and the explanation will not be repeated.

As shown in FIGS. 10A, 10B, and 11, in the display element 10 of this embodiment, the color filter layer 11 is provided not only on the upper substrate 2, but also on the lower substrate 3. Specifically, as shown in FIGS. 10A and 10B, the color filter layer 11 is formed on the surface of the lower substrate 3 that faces the display space S. This color filter layer 11 has the same size and shape as those of the color filter layer 11 provided on the upper substrate 2. In the lower substrate 3 of this embodiment, a transparent insulating film 19 made of, e.g., $SiO_2$ is formed on the color filter layer 11. Moreover, the reference electrodes 5 and the scanning electrodes 6 are placed on the insulating film 19, and the dielectric layer 13 is further provided to cover the reference electrodes 5 and the scanning electrodes 6.

In the display element 10 of this embodiment, a width W2 of the black matrix 11s is set so as to satisfy the following inequality (2):

$$R/2 + H/4 \leq W2 \quad (2)$$

where R represents the width of each of the ribs 14a, 14b and H represents the gap size between the upper substrate 2 and the lower substrate 3.

In the display element 10 of this embodiment, as shown in FIG. 11, the width W2 of the black matrix 11s is set so as to satisfy the inequality (2). In other words, since the black matrix 11s is provided on both the upper substrate 2 and the lower substrate 3 in the display element 10 of this embodiment, the width W2 of the black matrix 11s can be smaller than the width represented by the inequality (1) or (1)' in the above embodiments, so that the aperture (effective display region P1) can be made larger.

In the display element 10 of this embodiment, similarly to Embodiment 1, the color filter 11r and the black matrix 11s are provided so that the aperture ratio of the color filter 11r, i.e., the aperture (effective display region P1) is maximized in the pixel region P. As shown in FIG. 11, the width W2 of the black matrix 11s is set so as to satisfy the equality of the inequality (2), i.e., to be equal to R/2+H/4.

Hereinafter, the effect of providing the black matrix (light-shielding layer) 11s on both the upper substrate 2 and the lower substrate 3 in the display element 10 of this embodiment will be described in detail with reference to FIG. 12 as well as FIGS. 10A, 10B, and 11.

Figure 12:
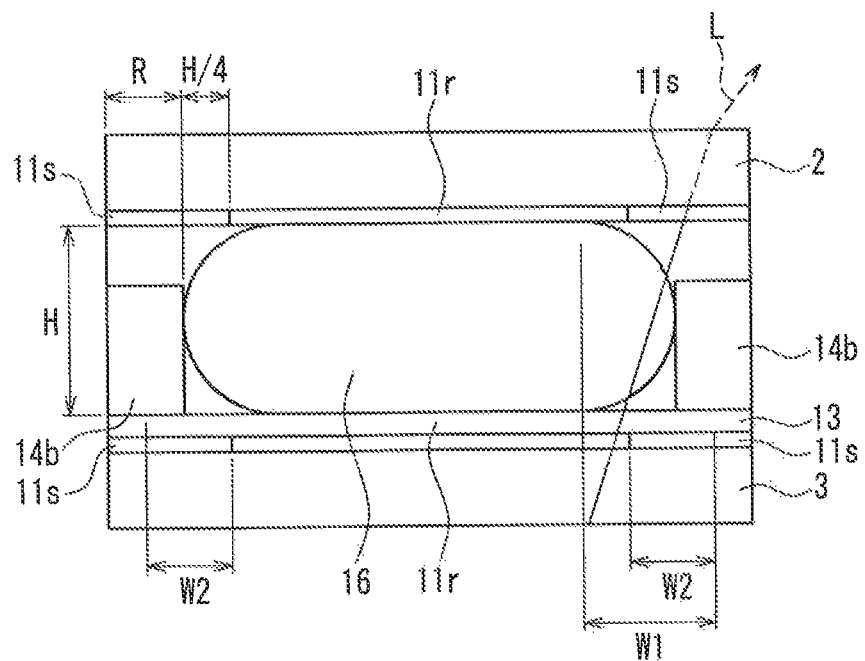
FIG. 12 is a diagram showing an operation example of the display element shown in FIG. 10.

FIG. 12 is a diagram showing an operation example of the display element shown in FIG. 10.

In the product of this embodiment, as indicated by the arrow L in FIG. 12, even if the illumination light passes through the color filter (aperture) 11r on the lower substrate 3 at the time the conductive liquid 16 has been moved to the effective display region P1 side, the light can be blocked by the black matrix 11s on the upper substrate 2. Thus, as shown in FIG. 12, even if the width W2 of the black matrix 11s is smaller than the width W1 of the black matrix 11s in Embodiment 1, the light can be blocked, e.g., by the black matrix 11s on the upper substrate 2. Consequently, in the display element 10 of this embodiment, the width of the color filter (aperture) 11r can be easily increased compared to that in Embodiment 1.

With the above configuration, this embodiment can have effects comparable to those of Embodiment 1. In this embodiment, the black matrix (light-shielding layer) 11s is provided on both the upper substrate (first substrate) 2 and the lower substrate (second substrate) 3. Moreover, in each of the pixel regions P, the width W2 of the black matrix 11s is set so as to satisfy the inequality (2). Thus, in the display element 10 of this embodiment, light can be sufficiently blocked by the conductive liquid 16 and each of the black matrixes 11s provided on the upper substrate 2 and the lower substrate 3 in each of the pixel regions P even when the display element 10 is seen from an oblique direction at the time the conductive liquid 16 has been moved to the aperture side.

In addition to the above description, similarly to Embodiment 2, the width W2 may be set so as to satisfy the inequality (2) by adjusting each of the parameters (i.e., the rib width and the gap size) of the left-hand side of the inequality (2).

It should be noted that the above embodiments are all illustrative and not restrictive. The technological scope of the present invention is defined by the appended claims, and all changes that come within the range of equivalency of the claims are intended to be embraced therein.

For example, in the above description, the present invention is applied to an image display apparatus including a display portion that can display color images. However, the present invention is not limited thereto, as long as it is applied to an electrical device with a display portion that displays the information including characters and images. For example, the present invention is suitable for various electrical devices with display portions such as a personal digital assistant such as an electronic organizer, a display apparatus for a personal computer or television, and an electronic paper.

In the description of Embodiments 1 to 3, the width of the black matrix (light-shielding layer) is defined so as to satisfy the inequalities (1) to (2). However, the present invention is not particularly limited, as long as the conductive liquid is colored a predetermined color, the non-effective display region is defined by the light-shielding layer provided on at least one of the upper substrate (first substrate) and the lower substrate (second substrate), the effective display region is defined by the aperture formed in the light-shielding layer, and the size of the light-shielding layer is determined based on the size of each of the ribs and the gap size between the first substrate and the second substrate.

In the above description, the electrowetting-type display element is used, in which the conductive liquid is moved in accordance with the application of an electric field to the conductive liquid. However, the display element of the present invention is not limited thereto, as long as it is an electric-field-induced display element that can change the display color on the display surface by moving the conductive liquid in the display space with the use of an external electric field. For example, the present invention can be applied to other types of electric-field-induced display elements such as an electroosmotic type, an electrophoretic type, and a dielectrophoretic type.

As described in each of the above embodiments, the electrowetting-type display element is preferred because the conductive liquid can be moved at a high speed and a low drive voltage. Moreover, since three different electrodes are used to move the conductive liquid slidably, the electrowetting-type display element can achieve both a high switching speed of the display color on the display surface and electric power saving more easily than the display element in which the shape of the conductive liquid is changed. In the electrowetting-type display element, the display color is changed with the movement of the conductive liquid. Therefore, unlike a liquid crystal display apparatus or the like, there is no viewing angle dependence. Moreover, since a switching device does not need to be provided for each pixel, a high-performance matrix-driven display element having a simple structure can be achieved at a low cost. Further, the electrowetting-type display element does not use a birefringent material such as a liquid crystal layer. Therefore, it is possible to easily provide a high brightness display element with excellent utilization efficiency of light from the backlight or ambient light used for information display.

In the above description, the ribs are provided on the lower substrate (second substrate). However, the ribs of the present invention are not limited thereto, and may be provided on at least one of the upper substrate (first substrate) and the lower substrate (second substrate) so as to partition the inside of the display space in accordance with each of the pixel regions. That is, the ribs may be provided on the first substrate on the display surface side.

The above description refers to the transmission type display element including a backlight. However, the present invention is not limited thereto, and may be applied to a reflection type display element including a light reflection portion such as a diffuse reflection plate, a semi-transmission type display element including the light reflection portion along with a backlight, or the like.

In the above description, the signal electrodes are provided on the upper substrate (first substrate) and the reference electrodes and the scanning electrodes are provided on the lower substrate (second substrate). However, the present invention is not limited thereto, and may have a configuration in which the signal electrodes are placed in the display space so as to come into contact with the conductive liquid, and the reference electrodes and the scanning electrodes are provided on one of the first substrate and the second substrate so as to be electrically insulated from the conductive liquid and each other. Specifically, e.g., the signal electrodes may be provided on the second substrate or on the ribs, and the reference electrodes and the scanning electrodes may be provided on the first substrate.

In the above description, the reference electrodes and the scanning electrodes are located on the effective display region side and the non-effective display region side, respectively. However, the present invention is not limited thereto, and the reference electrodes and the scanning electrodes may be located on the non-effective display region side and the effective display region side, respectively.

In the above description, the reference electrodes and the scanning electrodes are provided on the surface of the lower substrate (second substrate) that faces the display surface side. However, the present invention is not limited thereto, and can use the reference electrodes and the scanning electrodes that are buried in the second substrate made of an insulating material. In this case, the second substrate also can serve as a dielectric layer, which can eliminate the formation of the dielectric layer. Moreover, the signal electrodes may be directly provided on the first and second substrates serving as dielectric layers, and thus may be placed in the display space.

In the above description, the reference electrodes and the scanning electrodes are made of transparent electrode materials. However, the present invention is not limited thereto, as long as either one of the reference electrodes and the scanning electrodes, which are arranged to face the effective display regions of the pixels, are made of the transparent electrode materials. The other electrodes that do not face the effective display regions can be made of opaque electrode materials such as aluminum, silver, chromium, and other metals.

In the above description, the reference electrodes and the scanning electrodes are in the form of stripes. However, the shapes of the reference electrodes and the scanning electrodes of the present invention are not limited thereto. For example, the reflection type display element may use linear or mesh electrodes that are not likely to cause a light loss, since the utilization efficiency of light used for information display is lower in the reflection type display element than in the transmission type display element.

In the above description, the signal electrodes are linear wiring. However, the signal electrodes of the present invention are not limited thereto, and can be wiring with other shapes such as mesh wiring.

As described in each of the above embodiments, it is preferable that the shape of the signal electrodes is determined using the transmittance of the reference electrodes and the scanning electrodes that are transparent electrodes. This is because even if the signal electrodes are made of an opaque material, shadows of the signal electrodes can be prevented from appearing on the display surface, and thus a reduction in display quality can be suppressed. The use of the linear wiring is more preferred because the reduction in display quality can be reliably suppressed.

In the above description, the conductive liquid is a potassium chloride aqueous solution, and the signal electrodes include at least one of gold, silver, copper, platinum, and palladium. However, the present invention is not limited thereto, as long as a material that is electrochemically inert to the conductive liquid is used for the signal electrodes that are placed in the display space and come into contact with the conductive liquid. Specifically, the conductive liquid can be, e.g., a material including an electrolyte such as a zinc chloride, potassium hydroxide, sodium hydroxide, alkali metal hydroxide, zinc oxide, sodium chloride, lithium salt, phosphoric acid, alkali metal carbonate, or ceramics with oxygen ion conductivity. The solvent can be, e.g., an organic solvent such as alcohol, acetone, formamide, or ethylene glycol other than water. The conductive liquid of the present invention also can be an ionic liquid (room temperature molten salt) including pyridine-, alicyclic amine-, or aliphatic amine-based cations and fluorine anions such as fluoride ions or triflate.

As described in each of the above embodiments, the aqueous solution in which a predetermined electrolyte is dissolved is preferred for the conductive liquid because the display element can have excellent handling properties and also be easily produced.

The signal electrodes of the present invention may be in the passive state including an electrode body composed of a conductive metal such as aluminum, nickel, iron, cobalt, chromium, titanium, tantalum, niobium, or an alloy thereof and an oxide film disposed to cover the surface of the electrode body.

As described in each of the above embodiments, the signal electrodes including at least one of gold, silver, copper, platinum, and palladium are preferred because these metals have a low ionization tendency and make it possible not only to simplify the signal electrodes, but also to reliably prevent an electrochemical reaction between the signal electrodes and the conductive liquid. Thus, the display element can easily prevent a reduction in the reliability and have a long life. Moreover, with the use of the metals having a low ionization tendency, the interfacial tension at the interface between the signal electrodes and the conductive liquid can be relatively small. Therefore, when the conductive liquid is not moved, it can be easily held in a stable state at the fixed position.

In the above description, the nonpolar oil is used. However, the present invention is not limited thereto, as long as an insulating fluid that is not mixed with the conductive liquid is used. For example, air may be used instead of the oil. Moreover, silicone oil or an aliphatic hydrocarbon also can be used as the oil.

As described in each of the above embodiments, the nonpolar oil that is not compatible with the conductive liquid is preferred because the droplets of the conductive liquid move more easily in the nonpolar oil compared to the use of air and the conductive liquid. Consequently, the conductive liquid can be moved at a high speed, and the display color can be switched at a high speed.

In the above description, the black colored conductive liquid and the color filter layer are used to form the pixels of R, G, and B colors on the display surface side. However, the present invention is not limited thereto, as long as a plurality of pixel regions are provided in accordance with a plurality of colors that enable full-color display to be shown on the display surface. Specifically, the conductive liquids that are colored predetermined different colors such as RGB, CMY composed of cyan (C), magenta (M), and yellow (Y), or RGBYC also can be used. Moreover, the present invention may use the conductive liquid that is colored black and functions as a shutter without including the color filter layer, and thus may be applied, e.g., to an electronic paper that performs monochrome display.

In the description of Embodiments 1 and 2, the color filter layer is formed on the surface of the upper substrate (first substrate) that faces the non-display surface side. However, the present invention is not limited thereto, and the color filter layer may be formed on the surface of the first substrate that faces the display surface side or on the lower substrate (second substrate). Thus, the color filter layer is preferred compared to the use of the conductive liquids with different colors because the display element can be easily produced. Moreover, the color filter layer is also preferred because the effective display region and the non-effective display region can be properly and reliably defined with respect to the display space by the color filter (aperture) and the black matrix (light-shielding layer) included in the color filter layer, respectively.

INDUSTRIAL APPLICABILITY

The present invention is useful for a display element that can prevent a reduction in display quality even when the display element is seen from an oblique direction, and an electrical device using the display element.

DESCRIPTION OF REFERENCE NUMERALS

1 Image display apparatus (electrical device)
2 Upper substrate (first substrate)
3 Lower substrate (second substrate)
4 Signal electrode
5 Reference electrode
6 Scanning electrode
7 Signal driver (signal voltage application portion)
8 Reference driver (reference voltage application portion)
9 Scanning driver (scanning voltage application portion)
10 Display element
11 Color filter layer
11r, 11g, 11b Color filter (aperture)
11s Black matrix (light-shielding layer)
13 Dielectric layer
14 Rib
16 Conductive liquid
17 Oil (insulating fluid)
S Display space
P Pixel region
P1 Effective display region
P2 Non-effective display region
W1, W1', W2 Width of light-shielding layer
R, R' Width of Rib
H, H' Gap size

The invention claimed is:

1. A display element that comprises a first substrate provided on a display surface side, a second substrate provided on a non-display surface side of the first substrate so that a predetermined display space is formed between the first substrate and the second substrate, an effective display region and a non-effective display region that are defined with respect to the display space, and a conductive liquid sealed in the display space so as to be moved toward the effective display region or the non-effective display region, and that is capable of changing a display color on the display surface side by moving the conductive liquid, wherein the display element comprises:
a plurality of signal electrodes that are placed in the display space so as to come into contact with the conductive liquid, and are also provided along a predetermined arrangement direction;
a plurality of reference electrodes that are provided on one of the first substrate and the second substrate so as to be electrically insulated from the conductive liquid and to be located on one of the effective display region side and the non-effective display region side, and are also arranged so as to intersect with the plurality of the signal electrodes;
a plurality of scanning electrodes that are provided on one of the first substrate and the second substrate so as to be electrically insulated from the conductive liquid and the plurality of the reference electrodes and to be located on the other of the effective display region side and the non-effective display region side, and are also arranged so as to intersect with the plurality of the signals electrodes,
a plurality of pixel regions that are located at each of the intersections of the plurality of the signal electrodes and the plurality of the scanning electrodes; and
ribs that are provided on at least one of the first substrate and the second substrate so as to partition an inside of the display space in accordance with each of the plurality of the pixel regions, and
wherein the conductive liquid is colored a predetermined color,
the non-effective display region is defined by a light-shielding layer provided on at least one of the first substrate and the second substrate, and the effective display region is defined by an aperture formed in the light-shielding layer, and
a size of the light-shielding layer is determined based on a size of each of the ribs and a gap size between the first substrate and the second substrate.

2. The display element according to claim 1, wherein the light-shielding layer is provided on one of the first substrate and the second substrate, and in each of the plurality of the pixel regions, a width W1 of the light-shielding layer is set so as to satisfy the following inequality (1):

$$R/2 + H/2 \leq W1 \quad (1)$$

where R represents a width of each of the ribs and H represents the gap size between the first substrate and the second substrate.

3. The display element according to claim 1, wherein the light-shielding layer is provided on both the first substrate and the second substrate, and
in each of the plurality of the pixel regions, a width W2 of the light-shielding layer is set so as to satisfy the following inequality (2):

$$i\, R/2 + H/4 \leq W2 \quad (2)$$

where R represents a width of each of the ribs and H represents the gap size between the first substrate and the second substrate.

4. The display element according to claim 1, wherein the display element comprises:
a signal voltage application portion that is connected to the plurality of the signal electrodes and applies a signal voltage in a predetermined voltage range to each of the signal electrodes in accordance with information to be displayed on the display surface side;
a reference voltage application portion that is connected to the plurality of the reference electrodes and applies one of a selected voltage and a non-selected voltage to each of the reference electrodes, the selected voltage allowing the conductive liquid to move in the display space in accordance with the signal voltage and the non-selected voltage inhibiting a movement of the conductive liquid in the display space; and
a scanning voltage application portion that is connected to the plurality of the scanning electrodes and applies one of a selected voltage and a non-selected voltage to each of the scanning electrodes, the selected voltage allowing the conductive liquid to move in the display space in accordance with the signal voltage and the non-selected voltage inhibiting a movement of the conductive liquid in the display space.

5. The display element according to claim 1, wherein the plurality of the pixel regions are provided in accordance with a plurality of colors that enable full-color display to be shown on the display surface side.

6. The display element according to claim 1, wherein an insulating fluid that is not mixed with the conductive liquid is movably sealed in the display space.

7. The display element according to claim 1, wherein a dielectric layer is formed on the surfaces of the plurality of the reference electrodes and the plurality of the scanning electrodes.

8. An electrical device comprising a display portion that displays information including characters and images,
wherein the display portion comprises the display element according to claim 1.

* * * * *